United States Patent
Ishida et al.

(10) Patent No.: US 8,785,068 B2
(45) Date of Patent: Jul. 22, 2014

(54) FUEL CELL

(75) Inventors: Kentaro Ishida, Shioya-gun (JP); Takeshi Ushio, Utsunomiya (JP); Eri Terada, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 893 days.

(21) Appl. No.: 12/726,751

(22) Filed: Mar. 18, 2010

(65) Prior Publication Data

US 2010/0239931 A1  Sep. 23, 2010

(30) Foreign Application Priority Data

Mar. 18, 2009 (JP) .................................. 2009-066702
Apr. 28, 2009 (JP) .................................. 2009-109065

(51) Int. Cl.
*H01M 4/34* (2006.01)

(52) U.S. Cl.
USPC .......................................... 429/434; 429/433

(58) Field of Classification Search
USPC ....................................................... 429/434
See application file for complete search history.

(56) References Cited

U.S. PATENT DOCUMENTS

| | | | |
|---|---|---|---|
| 6,365,295 B1 | 4/2002 | Matsukawa et al. | |
| 2007/0207372 A1 | 9/2007 | Kikuchi et al. | |
| 2008/0118788 A1 | 5/2008 | Cartwright et al. | |

FOREIGN PATENT DOCUMENTS

| | | | | |
|---|---|---|---|---|
| JP | 2000-223137 | 8/2000 | | |
| JP | 2003-92121 | 3/2003 | | |
| JP | 2003092121 A | * 3/2003 | ............. | H01M 8/02 |
| JP | 2004-335147 | 11/2004 | | |
| JP | 2006-12466 | 1/2006 | | |
| JP | 2006012466 A | * 1/2006 | | |
| JP | 2006-32008 | 2/2006 | | |
| JP | 2007-234438 | 9/2007 | | |
| JP | 2008-123968 | 5/2008 | | |
| JP | 2008123968 A | * 5/2008 | | |
| JP | 2008-130565 | 6/2008 | | |

OTHER PUBLICATIONS

Japanese Office Action for Application No. 2009-109065, dated Jul. 26, 2011.
Japanese Office Action for Application No. 2009-066702, dated Jul. 26, 2011.

* cited by examiner

*Primary Examiner* — Gary Harris
(74) *Attorney, Agent, or Firm* — Nelson Mullins Riley Scarborough LLP; Anthony A. Laurentano (57) ABSTRACT

A fuel cell includes a cathode side separator. An oxygen-containing gas flow field is formed on a surface of the cathode side separator. The oxygen-containing gas flow field includes an inlet channel having a plurality of flow grooves connected to the oxygen-containing gas supply passage, an outlet channel having a plurality of flow grooves connected to the oxygen-containing gas discharge passage, and an intermediate channel having flow grooves with both ends connected to the inlet channel and the outlet channel respectively. The flow grooves of the outlet channel are longer than the flow grooves of the inlet channel, and the flow grooves of the outlet channel are narrowed toward the oxygen-containing gas discharge passage.

4 Claims, 10 Drawing Sheets

PRIOR ART

FUEL CELL

CROSS-REFERENCE TO RELATED APPLICATION

This application is based upon and claims the benefit of priority from Japanese Patent Applications No. 2009-066702 filed on Mar. 18, 2009 and No. 2009-109065 filed on Apr. 28, 2009, of which the contents are incorporated herein by reference.

BACKGROUND OF THE INVENTION

1. Field of the Invention

The present invention relates to a fuel cell formed by stacking an electrolyte electrode assembly and a separator in a stacking direction. The electrolyte electrode assembly includes electrodes and an electrolyte interposed between the electrodes. A reactant gas supply passage and a reactant gas discharge passage extend through the fuel cell for allowing a reactant gas to flow in the stacking direction. A reactant gas flow field is formed between the electrolyte electrode assembly and the separator for allowing the reactant gas to flow along an electrode surface.

2. Description of the Related Art

The fuel cell is a system for obtaining direct current electrical energy by supplying a fuel gas (gas chiefly containing hydrogen) to an anode and supplying an oxygen-containing gas (gas chiefly containing oxygen) to a cathode for inducing electrochemical reactions at the anode and the cathode.

For example, a solid polymer electrolyte fuel cell includes a power generation cell formed by sandwiching a membrane electrode assembly between separators. The membrane electrode assembly includes an anode, a cathode, and an electrolyte membrane interposed between the anode and the cathode. The electrolyte membrane is a polymer ion exchange membrane. In use of this type of power generation cell, typically, predetermined numbers of the membrane electrode assemblies and the separators are stacked together to form a fuel cell stack of the power generation cells, e.g., mounted in a vehicle.

In the fuel cell, a fuel gas flow field (reactant gas flow field) for supplying a fuel gas is formed on a separator surface facing the anode, and an oxygen-containing gas flow field (reactant gas flow field) for supplying an oxygen-containing gas is formed on a separator surface facing the cathode.

Further, so-called internal manifold structure may be adopted in the fuel cell. In the structure, an oxygen-containing gas supply passage and an oxygen-containing gas discharge passage extend through the fuel cell for allowing an oxygen-containing gas to flow through the fuel cell in the stacking direction, and a fuel gas supply passage and a fuel gas discharge passage extend through the fuel cell for allowing a fuel gas to flow through the fuel cell in the stacking direction. Further, a coolant supply passage and a coolant discharge passage extend through the fuel cell for allowing a coolant to flow through the fuel cell in the stacking direction.

In the reactant gas flow fields, condensed water is produced, and water produced in the power generation is present. The water tends to be retained at the outlet of the reactant gas flow fields. In the structure, the reactant gas flow fields may be clogged by the retained water, and the fuel gas and the oxygen-containing gas may not be supplied to the anode and the cathode suitably.

Figure 9:
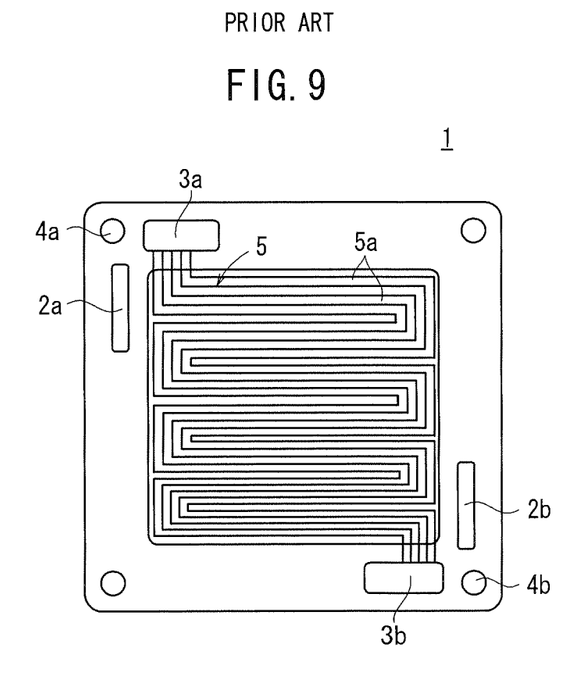
FIG. 9 is a view showing a separator of a fuel cell disclosed in Japanese Laid-Open Patent Publication No. 2000-223137.

In this regard, for example, a fuel cell disclosed in Japanese Laid-Open Patent Publication No. 2000-223137 includes a separator 1 as shown in FIG. 9. A fuel gas inlet 2a, an air inlet 3a, a coolant inlet 4a are arranged diagonally with a fuel gas outlet 2b, an air outlet 3b, and a coolant outlet 4b in the separator 1, and the inlets and the outlets extend through the separator 1.

An air channel 5 having a plurality of air flow grooves 5a are formed on one surface of the separator 1 for allowing the air supplied from the air inlet 3a to flow toward the air outlet 3b. The air flow grooves 5a of the air channel 5 flow in parallel, and form a serpentine flow field for allowing the air to flow left and right, and move downwardly.

The air flow grooves 5a of the air channel 5 are configured such that the sectional area in the flow field is progressively reduced from the air inlet 3a to the air outlet 3b, i.e., toward the downstream side. According to the disclosure, reduction in the flow speed at the air outlet 3b is suppressed, and the water is not retained easily on the air outlet 3b side advantageously.

However, in Japanese Laid-Open Patent Publication No. 2000-223137, since the air flow grooves 5a form the serpentine flow field, the flow grooves connecting the air inlet 3a to the air outlet 3b are significantly long. In the structure, the pressure loss in each of the air flow grooves 5a is significantly large. In particular, it is required to keep the high outputs of devices such as a compressor and a supercharger for supplying the air to the air inlet 3a. Therefore, the devices have large sizes uneconomically.

Figure 10:
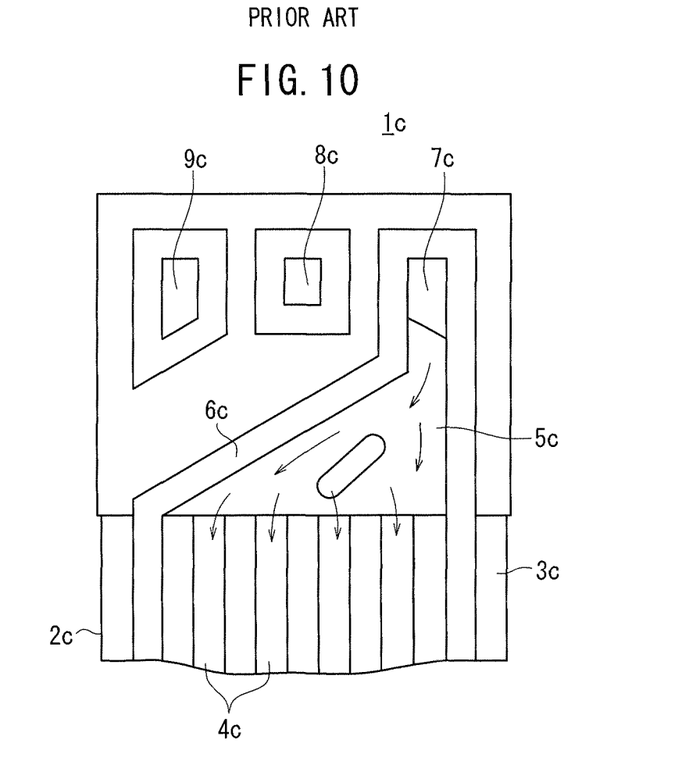
FIG. 10 is a view showing a fuel cell disclosed in Japanese Laid-Open Patent Publication No. 2006-032008.

Further, in a fuel cell disclosed in Japanese Laid-Open Patent Publication No. 2006-032008, as shown in FIG. 10, a hydrogen side separator 1c is provided. The separator 1c is formed by a single metal plate 2c. The separator 1c has a corrugated power generation area 3c formed by pressure forming.

A hydrogen gas flow field 4c is formed on one surface of the separator 1c, and a coolant water flow field is formed on the other surface of the separator 1c. A hydrogen gas distribution channel 5c for distributing a hydrogen gas to the hydrogen gas flow field 4c is formed inside a rib 6c formed integrally with the metal plate 2c by resin molding. A hydrogen manifold hole 7c, a coolant water manifold hole 8c, and an air manifold hole 9c extend through the separator 1c in the stacking direction. The hydrogen manifold hole 7c is connected to the hydrogen gas flow field 4c through the hydrogen gas distribution channel 5c.

However, in Japanese Laid-Open Patent Publication No. 2006-032008, the hydrogen cannot be distributed uniformly from the hydrogen manifold hole 7c to the hydrogen gas flow field 4c easily, and the hydrogen distribution performance is low. By designing flow grooves in the hydrogen gas distribution channel 5c connecting the hydrogen manifold hole 7c to the hydrogen gas flow field 4c to be considerably long, the desired hydrogen distribution performance may be achieved. However, in the structure, the separator 1 itself has a large size in the flow direction of the hydrogen gas flow field 4c, adversely.

SUMMARY OF THE INVENTION

The present invention has been made to solve the above problem, and an object of the present invention is to provide a fuel cell which makes it possible to reliably prevent water produced in a power generation reaction from being retained at the outlet of a reactant gas flow field, and ensure that the power generation reaction occurs desirably without any interruption.

Further, an object of the present invention is to provide a fuel cell in which improvement in the performance of distributing a fuel gas and an oxygen-containing gas is achieved without requiring any elongated separator, and the desired power generation performance is maintained.

The present invention relates to a fuel cell formed by stacking an electrolyte electrode assembly and a separator in a stacking direction. The electrolyte electrode assembly includes electrodes and an electrolyte interposed between the electrodes. A reactant gas supply passage and a reactant gas discharge passage extend through the fuel cell for allowing a reactant gas to flow in the stacking direction. A reactant gas flow field is formed between the electrolyte electrode assembly and the separator for allowing the reactant gas to flow along an electrode surface.

The reactant gas flow field includes an inlet channel having a plurality of flow grooves connected to the reactant gas supply passage, an outlet channel having a plurality of flow grooves connected to the reactant gas discharge passage, and an intermediate channel having a plurality of flow grooves with both ends connected to the inlet channel and the outlet channel respectively. The flow grooves of the outlet channel are longer than the flow grooves of the inlet channel.

Further, the present invention relates to a fuel cell formed by stacking an electrolyte electrode assembly and a separator in a stacking direction. The electrolyte electrode assembly includes a cathode, an anode, and an electrolyte interposed between the cathode and the anode, an oxygen-containing gas flow field for supplying an oxygen-containing gas along the cathode and a fuel gas flow field for supplying a fuel gas along the anode being formed in the fuel cell. An oxygen-containing gas supply passage and an oxygen-containing gas discharge passage for allowing the oxygen-containing gas to flow in the stacking direction, and a fuel gas supply passage and a fuel gas discharge passage for allowing the fuel gas to flow in the stacking direction are provided in the fuel cell.

The oxygen-containing gas discharge passage, and a pair of the fuel gas supply passages on both sides of the oxygen-containing gas discharge passage are provided at one end of the separator.

The fuel gas discharge passage, and a pair of the oxygen-containing gas supply passages on both sides of the fuel gas discharge passage are provided at the other end of the separator.

According to an aspect of the present invention, the flow grooves of the outlet channel connecting the intermediate channel and the reactant gas discharge passage are longer than the flow grooves of the inlet channel connecting the intermediate channel and the reactant gas supply passage. In the structure, in the outlet channel where the flow grooves are narrowed from the intermediate channel toward the reactant gas discharge passage, the flow grooves are relatively long, and the flow speed of the reactant gas is increased, and improvement in the performance of discharging the retained water which tends to be condensed over a wide area is achieved.

Accordingly, though the water produced in the power generation tends to be retained at the outlet of the reactant gas flow field, the water can be discharged easily and reliably into the reactant gas discharge passage. Thus, with the simple structure, the performance of discharging the water is improved, and it is possible to ensure that the power generation reaction occurs desirably without any interruptions.

Further, according to an aspect of the present invention, since a pair of fuel gas supply passages are provided at one end of the separator, the fuel gas can be distributed suitably, and the length of the flow grooves extending from the fuel gas supply passages to the fuel gas flow field is reduced effectively. Further, since a pair of oxygen-containing gas supply passages are provided at the other end of the separator, improvement in the performance of distributing the oxygen-containing gas is achieved, and the length of the flow grooves extending from the oxygen-containing gas supply passages to the oxygen-containing gas flow field is reduced effectively.

Accordingly, it is possible to improve the performance of distributing the fuel gas and the oxygen-containing gas without requiring any elongated separators.

Further, the fuel gas and the oxygen-containing gas flow in a counterflow manner over the entire electrode surfaces. In the structure, the humidity environment in the electrode surfaces is uniformized easily, and improvement in the power generation performance is achieved.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
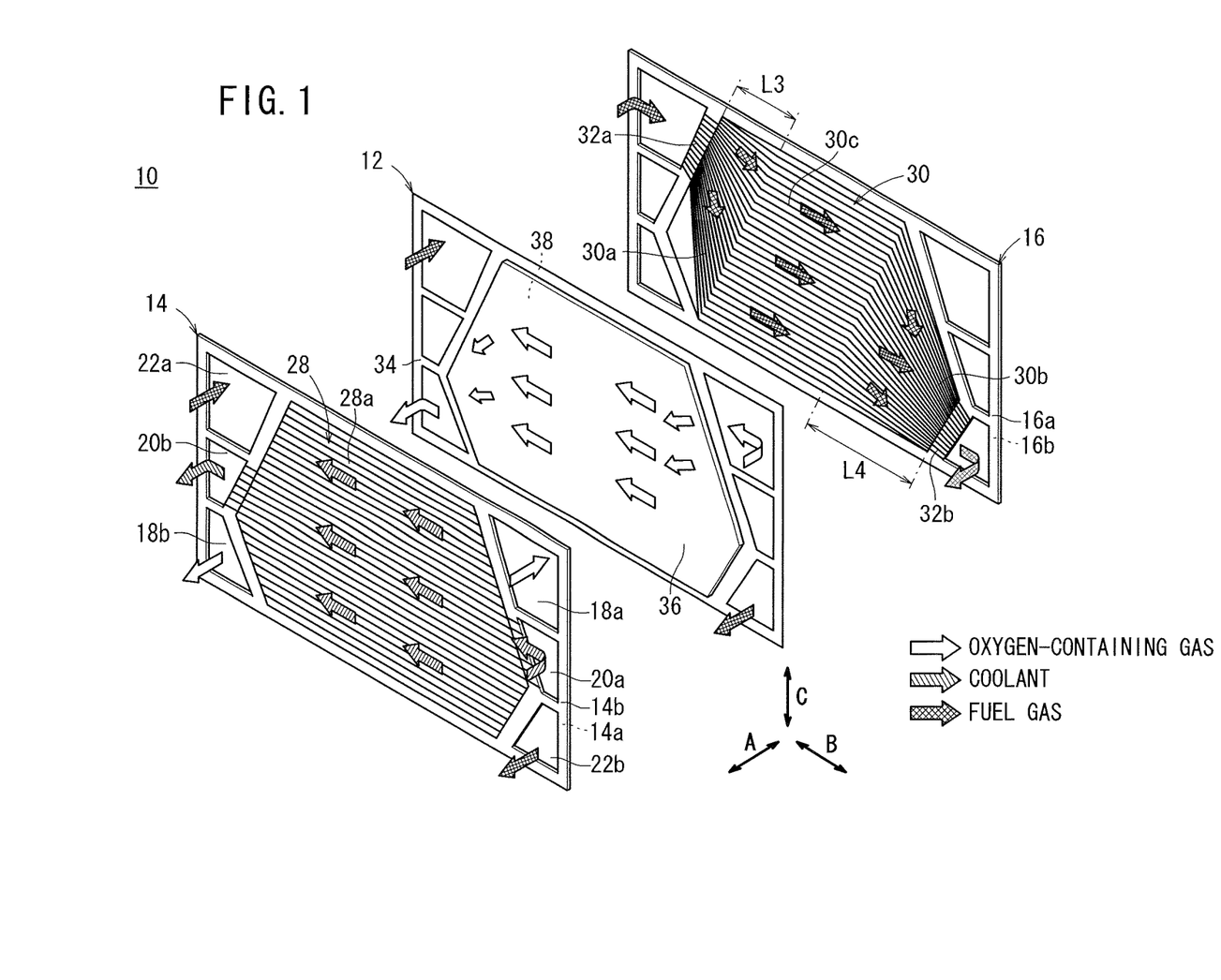
FIG. 1 is an exploded perspective view showing a fuel cell according to a first embodiment of the present invention.

As shown in FIG. 1, a fuel cell 10 according to a first embodiment of the present invention includes a membrane electrode assembly (electrolyte electrode assembly) 12, and a cathode side separator 14 and an anode side separator 16 sandwiching the membrane electrode assembly 12. For example, the cathode side separator 14 and the anode side separator 16 are carbon separators. Alternatively, the cathode side separator 14 and the anode side separator 16 may be formed by corrugating metal separators.

At one end of the fuel cell 10 in a horizontal direction indicated by an arrow B, an oxygen-containing gas supply passage 18a for supplying an oxygen-containing gas (reactant gas), a coolant supply passage 20a for supplying a coolant, and a fuel gas discharge passage 22b for discharging a fuel gas (reactant gas), e.g., a hydrogen-containing gas, are provided. The oxygen-containing gas supply passage 18a, the coolant supply passage 20a, and the fuel gas discharge passage 22b extend through the fuel cell 10 in the direction indicated by an arrow A.

At the other end of the fuel cell 10 in the direction indicated by the arrow B, an oxygen-containing gas discharge passage 18b for discharging the oxygen-containing gas, a coolant discharge passage 20b for discharging the coolant, and a fuel gas supply passage 22a for supplying the fuel gas are provided. The oxygen-containing gas discharge passage 18b, the coolant discharge passage 20b, and the fuel gas supply passage 22a extend through the fuel cell 10 in the direction indicated by the arrow A.

Figure 2:
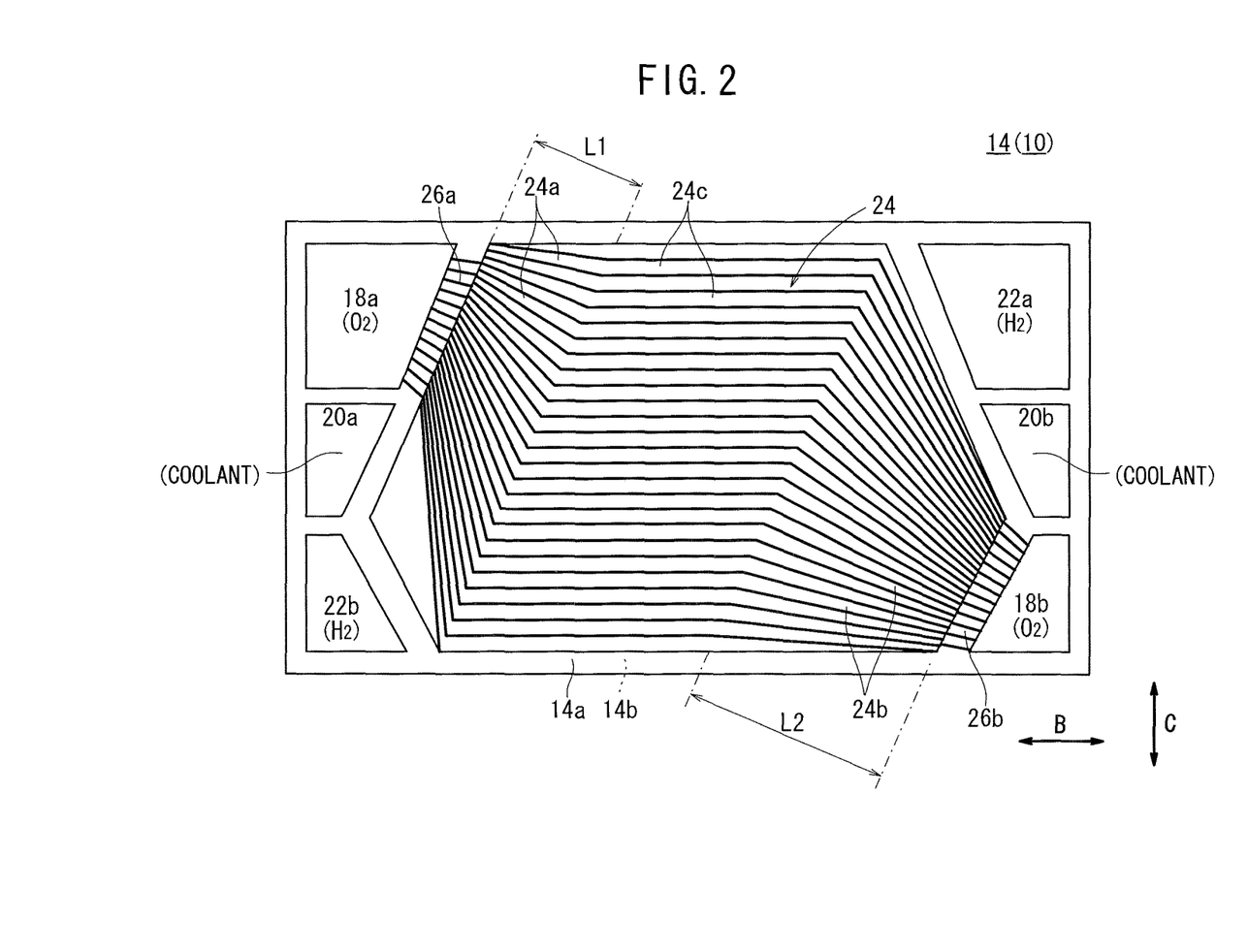
FIG. 2 is a front view showing a cathode side separator of the fuel cell.

As shown in FIGS. 1 and 2, the cathode side separator 14 has an oxygen-containing gas flow field 24 on a surface 14a facing the membrane electrode assembly 12 for allowing the oxygen-containing gas to flow between the membrane electrode assembly 12 and the separator surface.

As shown in FIG. 2, the oxygen-containing gas flow field 24 includes an inlet channel 24a having a plurality of flow grooves connected to the oxygen-containing gas supply passage 18a and an outlet channel 24b having a plurality of flow grooves connected to the oxygen-containing gas discharge passage 18b, and an intermediate channel 24c having a plurality of flow grooves with both ends connected to the inlet channel 24a and the outlet channel 24b respectively. The length L1 of the flow grooves of the inlet channel 24a is smaller than the length L2 of the flow grooves of the outlet channel 24b (L1<L2).

The inlet channel 24a form a first narrowed portion where the flow grooves in the inlet channel 24a are narrowed from the intermediate channel 24c toward the oxygen-containing gas supply passage 18a. The outlet channel 24b forms a second narrowed portion where the flow grooves in the outlet channel 24b are narrowed from the intermediate channel 24c toward the oxygen-containing gas discharge passage 18b. The flow grooves of the intermediate channel 24c extend in the direction indicated by the arrow B in parallel to each other, and have the same length.

An inlet connection channel 26a is formed between the oxygen-containing gas supply passage 18a and the inlet channel 24a. The inlet connection channel 26a includes a plurality of flow grooves extending in parallel to each other. An outlet connection channel 26b is formed between the oxygen-containing gas discharge passage 18b and the outlet channel 24b. The outlet connection channel 26b has a plurality of flow grooves extending in parallel to each other.

As shown in FIG. 1, a coolant flow field 28 is formed on a surface 14b, opposite to the surface 14a of the cathode side separator 14. The coolant flow field 28 is connected to the coolant supply passage 20a and the coolant discharge passage 20b, and has a plurality of flow grooves 28a extending in the direction indicated by the arrow B.

The anode side separator 16 has a fuel gas flow field 30 on a surface 16a facing the membrane electrode assembly 12 for supplying the fuel gas between the membrane electrode assembly 12 and the separator surface.

The fuel gas flow field 30 includes an inlet channel 30a having a plurality of flow grooves connected to the fuel gas supply passage 22a, an outlet channel 30b having a plurality of flow grooves connected to the fuel gas discharge passage 22b, and an intermediate channel 30c having a plurality of flow grooves with both ends connected to the inlet channel 30a and the outlet channel 30b respectively. The length L3 of the flow grooves of the inlet channel 30a is smaller than the length L4 of the flow grooves of the outlet channel 30b (L3<L4).

The inlet channel 30a forms a first narrowed portion where the flow grooves of the inlet channel 30a are narrowed from the intermediate channel 30c toward the fuel gas supply passage 22a. The outlet channel 30b includes a second narrowed portion where the flow grooves of the outlet channel 30b are narrowed from the intermediate channel 30c toward the fuel gas discharge passage 22b. The flow grooves of the intermediate channel 30c extend in the direction indicated by the arrow B in parallel to each other, and have the same length.

An inlet connection channel 32a is formed between the fuel gas supply passage 22a and the inlet channel 30a. The inlet connection channel 32a includes a plurality of flow grooves extending in parallel to each other. An outlet connection channel 32b is formed between the fuel gas discharge passage 22b and the outlet channel 30b. The outlet connection channel 32b has a plurality of flow grooves extending in parallel to each other.

Though not shown, seal members are provided on the cathode side separator 14 and the anode side separator 16.

Each of the membrane electrode assemblies 12 includes a cathode 36, an anode 38, and a solid polymer electrolyte membrane (electrolyte) 34 interposed between the cathode 36 and the anode 38. The solid polymer electrolyte membrane 34 is formed by impregnating a thin membrane of perfluorosulfonic acid with water, for example. For example, the cathode 36 and the anode 38 have a hexagonal shape.

The cathode 36 has a gas diffusion layer of porous conductive material such as a carbon paper, and an electrode catalyst layer of platinum alloy supported on porous carbon particles. The carbon particles are deposited uniformly on the surface of the gas diffusion layer. The electrode catalyst layer of the cathode 36 is fixed to one surface of the solid polymer electrolyte membrane 34.

The anode 38 has a gas diffusion layer of porous conductive material such as a carbon paper, and an electrode catalyst layer of platinum alloy supported on porous carbon particles. The carbon particles are deposited uniformly on the surface of the gas diffusion layer. The electrode catalyst layer of the anode 38 is fixed to the other surface of the solid polymer electrolyte membrane 34.

Operation of the fuel cell 10 will be described below.

As shown in FIG. 1, an oxygen-containing gas such as the air is supplied to the oxygen-containing gas supply passage 18a, and a fuel gas such as a hydrogen gas is supplied to the fuel gas supply passage 22a.

The oxygen-containing gas flows from the oxygen-containing gas supply passage 18a into the oxygen-containing gas flow field 24 formed on the surface 14a of the cathode side separator 14. Thus, the oxygen-containing moves along the oxygen-containing gas flow field 24, and the oxygen-containing gas is supplied to the cathode 36 of the membrane electrode assembly 12 for inducing an electrochemical reaction at the cathode 36.

The fuel gas flows from the fuel gas supply passage 22a into the fuel gas flow field 30 of the anode side separator 16. The fuel gas moves along the fuel gas flow field 30, and the fuel gas is supplied to the anode 38 of the membrane electrode assembly 12 for inducing an electrochemical reaction at the anode 38.

Thus, in the membrane electrode assembly 12, the oxygen-containing gas supplied to the cathode 36 and the fuel gas supplied to the anode 38 are consumed in the electrochemical reactions at electrode catalyst layers of the cathode 36 and the anode 38 for generating electricity.

Then, the oxygen-containing gas consumed at the cathode 36 is discharged into the oxygen-containing gas discharge passage 18b. The fuel gas consumed at the anode 38 is discharged into the fuel gas discharge passage 22b.

Further, a coolant such as pure water, ethylene glycol, oil or the like is supplied to the coolant supply passage 20a. The coolant flows along the coolant flow field 28 formed between the anode side separator 16 and the cathode side separator 14.

After the coolant cools the membrane electrode assembly 12, the coolant is discharged into the coolant discharge passage 20b.

In the first embodiment, as shown in FIG. 2, the oxygen-containing gas flow field 24 provided in the cathode side separator 14 has the inlet channel 24a forming the first narrowed portion, the outlet channel 24b forming the second narrowed portion, and the intermediate channel 24c including the parallel flow grooves. The length L2 of the flow grooves of the outlet channel 24b is larger than the length L1 of the flow grooves of the inlet channel 24a.

In the structure, the outlet channel 24b is narrowed from the intermediate channel 24c toward the oxygen-containing gas discharge passage 18b to have a flow speed gradient, i.e., to have the capability of increasing the flow speed of the oxygen-containing gas, and the outlet channel 24b is relatively elongated. Therefore, the flow speed of the oxygen-containing gas flowing through the outlet channel 24b is increased. Thus, though the water produced in the fuel cell 10 tends to condense over a wide area at the outlet of the oxygen-containing gas flow field 24, the water is discharged smoothly.

Accordingly, the produced water which tends to be retained at the outlet of the oxygen-containing gas flow field 24 can be discharged into the oxygen-containing gas discharge passage 18b easily and reliably. With the simple structure, improvement in the performance of discharging the water is achieved, and the power generation reaction occurs desirably without any interruption.

Further, in the first embodiment, the oxygen-containing gas in the oxygen-containing gas flow field 24 and the fuel gas in the fuel gas flow field 30 flow in a counterflow manner. The oxygen-containing gas in the oxygen-containing gas flow field 24 and the coolant in the coolant flow field 28 flow in parallel to each other. In the structure, it is possible to achieve a uniform humidity distribution on the power generation surfaces of the membrane electrode assembly 12, and improvement in the power generation performance is achieved easily.

Further, the oxygen-containing gas, the fuel gas, and the coolant do not flow in serpentine patterns, but flow straight. In the structure, it is possible to achieve a uniform distribution on the power generation surfaces of the membrane electrode assembly 12, and improvement in the power generation performance is achieved easily.

Figure 3:
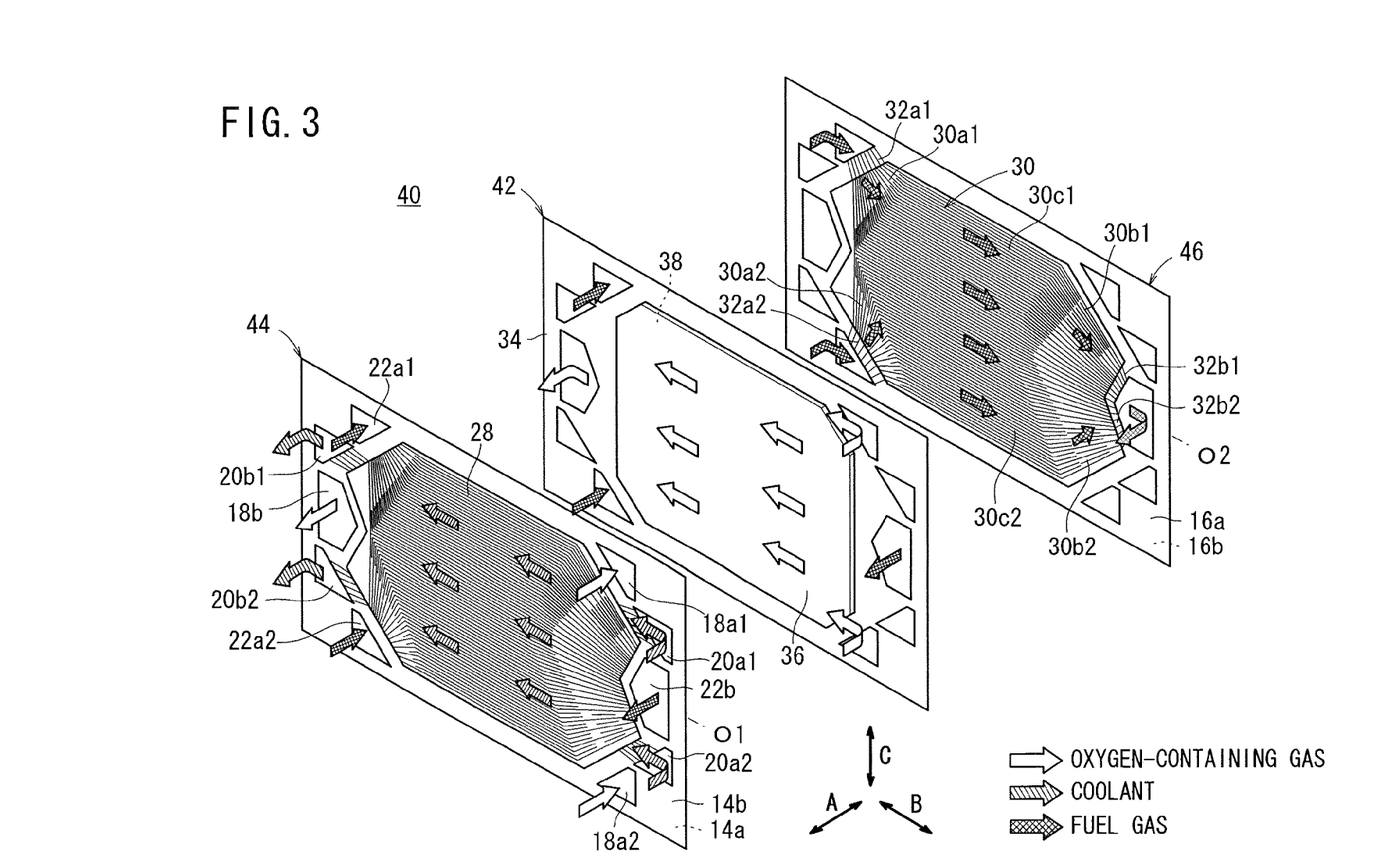
FIG. 3 is an exploded perspective view showing a fuel cell according to a second embodiment of the present invention.

FIG. 3 is an exploded perspective view showing a fuel cell 40 according to a second embodiment of the present invention.

The constituent elements that are identical to those of the fuel cell 10 according to the first embodiment are labeled with the same reference numerals, and detailed descriptions thereof will be omitted. Further, in third and fourth embodiments as described later, the constituent elements that are identical to those of the fuel cell 10 according to the first embodiment are labeled with the same reference numerals, and detailed descriptions thereof will be omitted.

The fuel cell 40 includes a membrane electrode assembly 42, and a cathode side separator 44 and an anode side separator 46 sandwiching the membrane electrode assembly 42. The cathode side separator 44 and the anode side separator 46 are metal separators. Alternatively, carbon separators may be used as the cathode side separator 44 and the anode side separator 46.

At one end of the fuel cell 40 in a direction indicated by an arrow B, a pair of oxygen-containing gas supply passages 18a1, 18a2 at upper and lower positions, a pair of coolant supply passages 20a1, 20a2 between the oxygen-containing gas supply passages 18a1, 18a2, and a single fuel gas discharge passage 22b between the coolant supply passages 20a1, 20a2 are provided.

At the other end of the fuel cell 40 in the direction indicated by the arrow B, a pair of fuel gas supply passages 22a1, 22a2 at upper and lower positions, a pair of coolant discharge passages 20b1, 20b2 between the fuel gas supply passages 22a1, 22a2, and a single oxygen-containing gas discharge passage 18b between the coolant discharge passages 20b1, 20b2 are provided.

Figure 4:
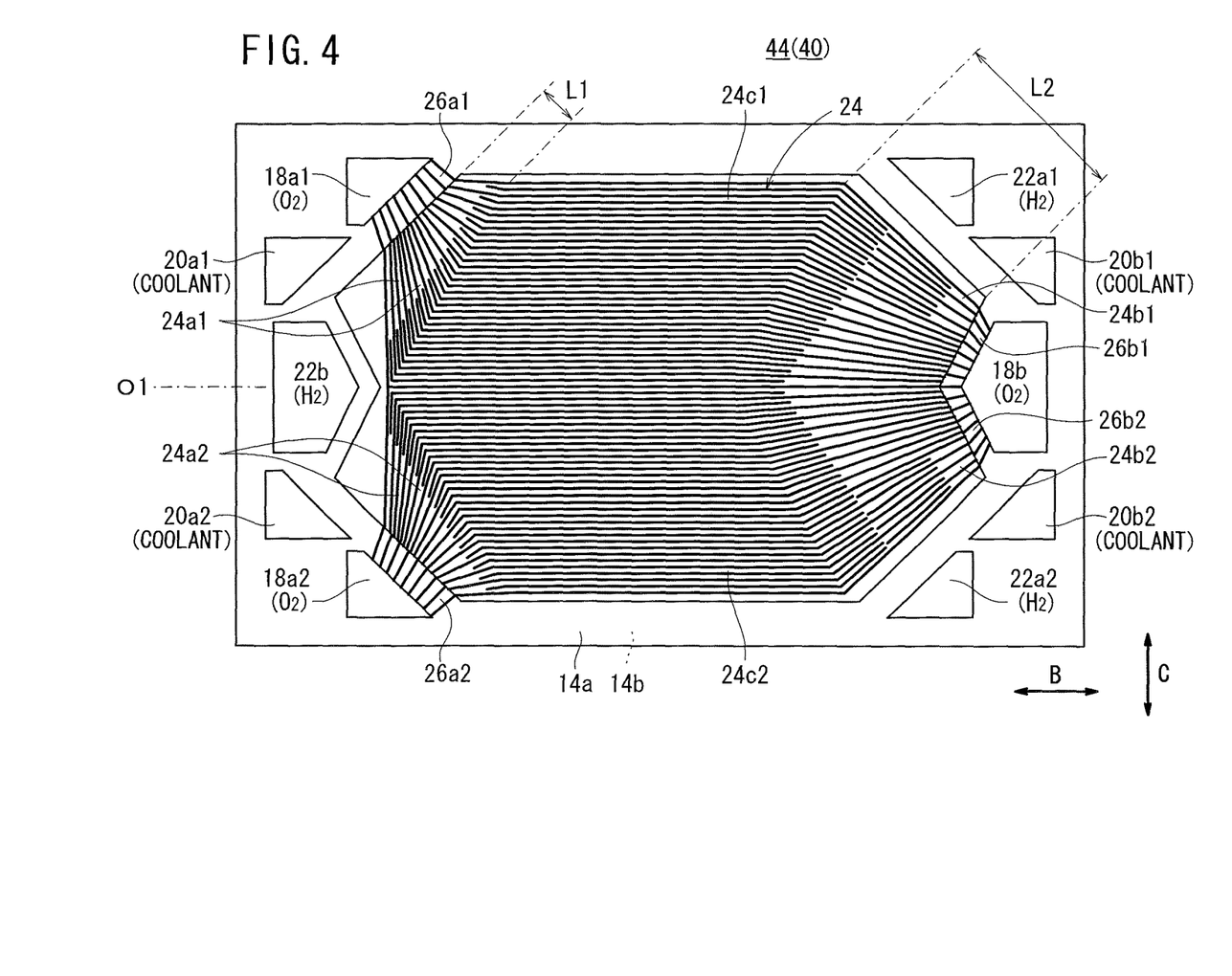
FIG. 4 is a front view showing a cathode side separator of the fuel cell.

As shown in FIG. 4, an oxygen-containing gas flow field 24 is formed on a surface 14a of the cathode side separator 44. The oxygen-containing gas flow field 24 includes inlet channels 24a1, 24a2 each having a plurality of flow grooves connected to the oxygen-containing gas supply passages 18a1, 18a2, respectively, outlet channels 24b1, 24b2 each having a plurality of flow grooves connected to the oxygen-containing gas discharge passage 18b, an intermediate channel 24c1 having a plurality of flow grooves with both ends connected to the inlet channel 24a1 and the outlet channel 24b1 respectively, and an intermediate channel 24c2 each having a plurality of flow grooves with both ends connected to the inlet channel 24a2 and the outlet channel 24b2 respectively.

The inlet channels 24a1, 24a2 form a first narrowed portion. Each of the flow grooves in the inlet channels 24a1, 24a2 extends from the oxygen-containing gas supply passages 18a1, 18a2 to the intermediate channels 24c1, 24c2 and is divided into two flow grooves in midstream. Then, the flow grooves in the inlet channels 24a1, 24a2 are curved horizontally, and connected to the respective intermediate channels 24c1, 24c2.

The outlet channels 24b1, 24b2 are connected to the intermediate channels 24c1, 24c2. The direction of the flow grooves is changed toward a central line O1. The outlet channels 24b1, 24b2 have a portion where two flow grooves are merged into one flow groove, and a portion where three flow grooves are merged into two flow grooves, and then merged into one flow groove.

Inlet connection channels 26a1, 26a2 each having a plurality of flow grooves extending in parallel to each other are provided between the oxygen-containing gas supply passages 18a1, 18a2 and the inlet channels 24a1, 24a2. Outlet connection channels 26b1, 26b2 each having a plurality of flow grooves extending in parallel to each other are provided between the oxygen-containing gas discharge passage 18b and the outlet channels 24b1, 24b2.

The cathode side separator 44 has a vertically symmetrical shape with respect to the central line O1 extending in the direction indicated by the arrow B, at the center in a direction indicated by an arrow C (see FIG. 4).

As shown in FIG. 3, a fuel gas flow field 30 is formed on a surface 16a of the anode side separator 46. The fuel gas flow field 30 includes inlet channels 30a1, 30a2 each having a plurality of flow grooves connected to the fuel gas supply passages 22a1, 22a2, outlet channels 30b1, 30b2 each having a plurality of flow grooves connected to the single fuel gas discharge passage 22b, an intermediate channel 30c1 having a plurality of flow grooves with both ends connected to the inlet channel 30a1 and the outlet channel 30b1 respectively, and an intermediate channel 30c2 having a plurality of flow grooves with both ends connected to the inlet channel 30a2 and the outlet channel 30b2 respectively.

The length of the flow grooves of the outlet channels 30b1, 30b2 is longer than the length of the flow grooves of the inlet channels 30a1, 30a2. The number of flow grooves in the inlet channels 30a1, 30a2 is increased toward the intermediate channels 30c1, 30c2. The outlet channels 30b1, 30b2 have portions where the number of flow grooves is decreased from two to one from the intermediate channels 30c1, 30c2 toward the fuel gas discharge passage 22b, and portions where the number of flow grooves is decreased from three to two, and then two to one from the intermediate channels 30c1, 30c2 toward the fuel gas discharge passage 22b.

Inlet connection channels 32a1, 32a2 are provided between the fuel gas supply passages 22a1, 22a2 and the inlet channels 30a1, 30a2. Outlet connection channels 32b1, 32b2 are provided between the fuel gas discharge passage 22b and the outlet channels 30b1, 30b2.

The anode side separator 46 has a vertically symmetrical shape with respect to the central line O2 extending in the direction indicated by the arrow B, at the center in a direction indicated by the arrow C.

A surface 14b of the cathode side separator 44 and a surface 16b of the anode side separator 46 are overlapped with each other, and the coolant flow field 28 is formed between the back surface of the oxygen-containing gas flow field 24 and the back surface of the fuel gas flow field 30.

In the second embodiment, the same advantages as in the case of the first embodiment are obtained.

Further, as shown in FIG. 4, the outlet channels 24b1, 24b2 of the oxygen-containing gas flow field 24 include portions where the number of flow grooves is reduced from two to one, and portions where the number of flow grooves is reduced from three to two, and then, two to one. In the structure, the flow rate adjustment can be made without adding a pressure loss element such as the narrowed portion. In particular, it is possible to eliminate the retained water droplets as much as possible.

Figure 5:
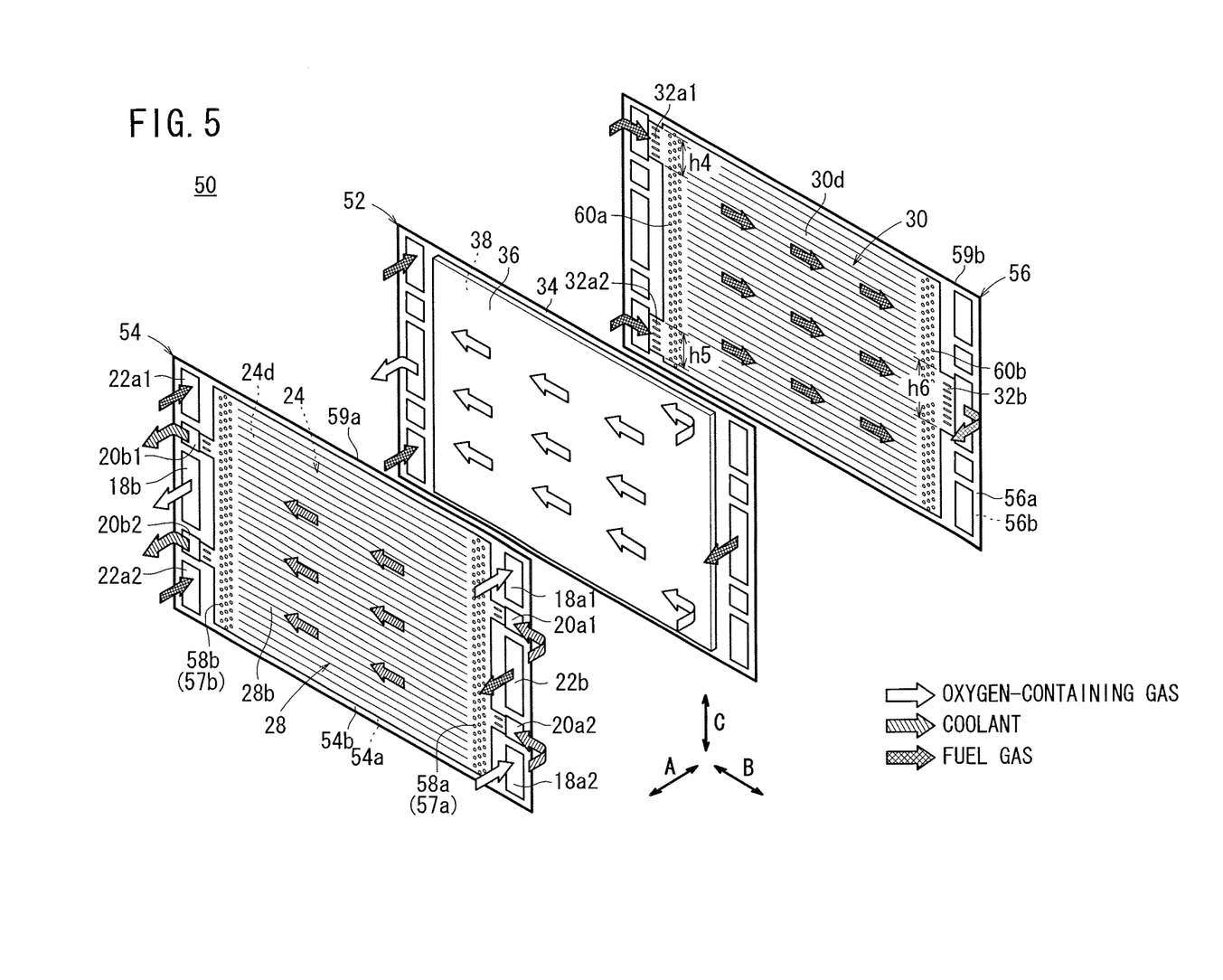
FIG. 5 is an exploded perspective view showing a fuel cell according to a third embodiment of the present invention.

FIG. 5 is an exploded perspective view showing a fuel cell 50 according to a third embodiment of the present invention.

The fuel cell 50 includes a membrane electrode assembly 52, and a cathode side separator 54 and an anode side separator 56 sandwiching the membrane electrode assembly 52. For example, the cathode side separator 54 and the anode side separator 56 are formed by corrugating metal separators. Alternatively, carbon separators may be used as the cathode side separator 54 and the anode side separator 56.

At one end of the fuel cell 50 in a horizontal direction indicated by an arrow B, a pair of oxygen-containing gas supply passages 18a1, 18a2 at upper and lower positions, a pair of coolant supply passages 20a1, 20a2 at upper and lower positions between the oxygen-containing gas supply passages 18a1, 18a2, and a single fuel gas discharge passage 22b between the coolant supply passages 20a1, 20a2 are provided. The oxygen-containing gas supply passages 18a1, 18a2, the coolant supply passages 20a1, 20a2, and the fuel gas discharge passage 22b extend through the fuel cell 50 in the direction indicated by an arrow A.

At the other end of the fuel cell 50 in the horizontal direction indicated by the arrow B, a pair of fuel gas supply passages 22a1, 22a2 at upper and lower positions, a pair of coolant discharge passages 20b1, 20b2 at upper and lower positions between the fuel gas supply passages 22a1, 22a2, and a single oxygen-containing gas discharge passage 18b between the coolant discharge passages 20b1, 20b2 are provided. The fuel gas supply passages 22a1, 22a2, the coolant discharge passages 20b1, 20b2, and the oxygen-containing gas discharge passage 18b extend through the fuel cell 50 in the direction indicated by the arrow A.

Figure 6:
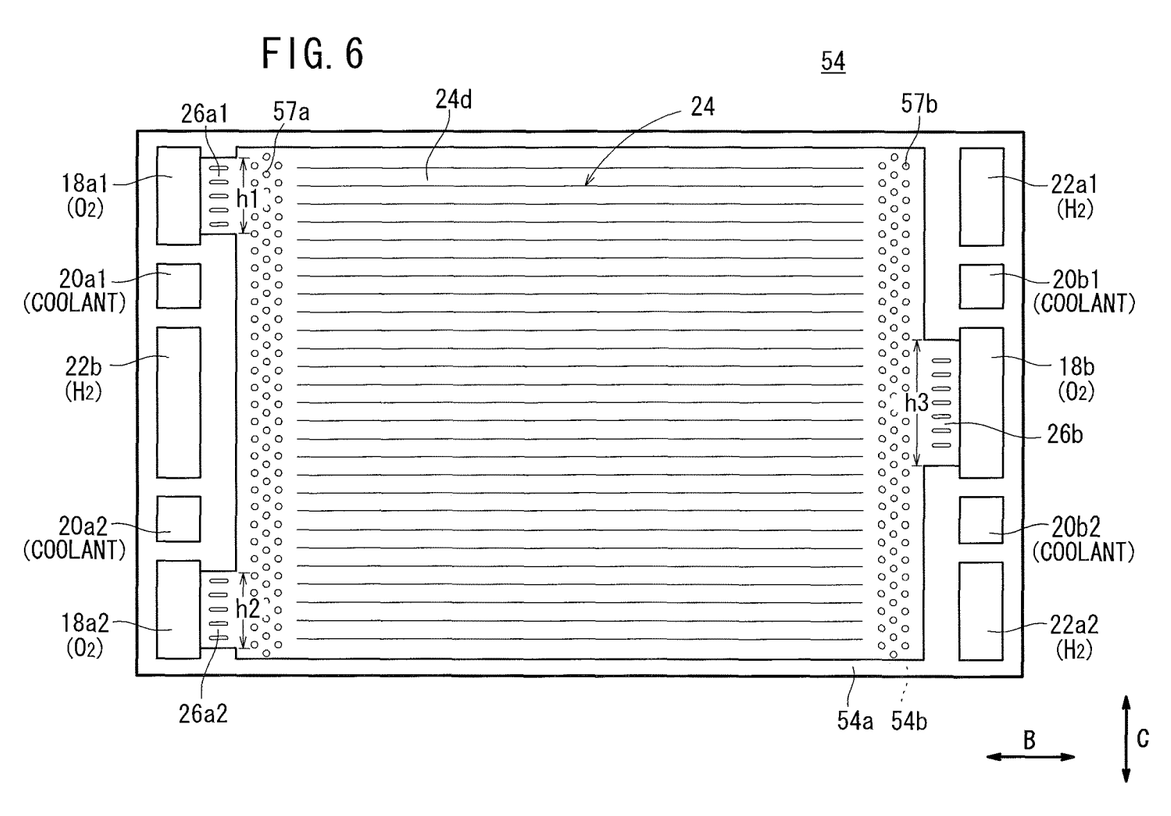
FIG. 6 is a front view showing a cathode side separator of the fuel cell.

As shown in FIG. 6, an inlet buffer 57a and an outlet buffer 57b are provided on a surface 54a of the cathode side separator 54. The inlet buffer 57a is connected to the oxygen-containing gas supply passages 18a1, 18a2 through inlet connection channels 26a1, 26a2. The outlet buffer 57b is connected to the oxygen-containing gas discharge passage 18b through the outlet connection channel 26b. The oxygen-containing gas flow field 24 has a plurality of flow grooves 24d with both ends connected to the inlet buffer 57a and the outlet buffer 57b respectively, and extending in the direction indicated by the arrow B.

The total dimension (h1+h2) of the width h1 where the oxygen-containing gas flows into the inlet connection channel 26a1 connected to the oxygen-containing gas supply passage 18a1 and the width h2 where the oxygen-containing gas flows into the inlet connection channel 26a2 connected to the oxygen-containing gas supply passage 18a1 is larger than the width h3 where the oxygen-containing gas is discharged through the outlet connection channel 26b connected to the oxygen-containing gas discharge passage 18b (h1+h2>h3).

As shown in FIG. 5, the coolant flow field 28 is formed on the surface 54b, opposite to the surface 54a of the cathode side separator 54. Further, an inlet buffer 58a and an outlet buffer 58b are formed on the surface 54b. The inlet buffer 58a is connected to the coolant supply passages 20a1, 20a2, and the outlet buffer 58b is connected to the coolant discharge passages 20b1, 20b2. The coolant flow field 28 has a plurality of flow grooves 28b extending in the direction indicated by the arrow B. The flow grooves 28b are formed on the back surface of the flow grooves 24d.

An inlet buffer 60a and an outlet buffer 60b are formed on a surface 56a of the anode side separator 56. The inlet buffer 60a is connected to the fuel gas supply passages 22a1, 22a2 through inlet connection channels 32a1, 32a2, and the outlet buffer 60b is connected to the fuel gas discharge passage 22b through the outlet connection channel 32b. The fuel gas flow field 30 has a plurality of flow grooves 30d with both ends connected to the inlet buffer 60a and the outlet buffer 60b respectively, and extending in the direction indicated by arrow B.

The total dimension (h4+h5) of the width h4 where the fuel gas flows into the inlet connection channel 32a1 connected to the fuel gas supply passage 22a1 and the width h5 where the fuel gas flows into the inlet connection channel 32a2 connected to the fuel gas supply passage 22a2 is larger than the width h6 where the fuel gas is discharged through the outlet connection channel 32b connected to the fuel gas discharge passage 22b (h4+h5>h6).

Seal members 59a, 59b are formed integrally with the cathode side separator 54 and the anode side separator 56.

Operation of the fuel cell 50 will be descried below.

As shown in FIG. 5, an oxygen-containing gas such as the air is supplied to the oxygen-containing gas supply passages 18a1, 18a2, and a fuel gas such as a hydrogen gas is supplied to the fuel gas supply passage 22a1, 22a2.

The oxygen-containing gas from the oxygen-containing gas supply passages 18a1, 18a2 flow into the oxygen-containing gas flow field 24 through the inlet buffer 57a formed on the surface 54a of the cathode side separator 54. Thus, the oxygen-containing gas moves along the oxygen-containing gas flow field 24, and the oxygen-containing gas is supplied to the cathode 36 of the membrane electrode assembly 52 for inducing an electrochemical reaction at the cathode 36.

The fuel gas from the fuel gas supply passages 22a1, 22a2 flows into the fuel gas flow field 30 through the inlet buffer 60a of the anode side separator 56. Thus, the fuel gas moves along the fuel gas flow field 30, and the fuel gas is supplied to the anode 38 of the membrane electrode assembly 52 for inducing an electrochemical reaction at the anode 38.

Thus, in the membrane electrode assembly 52, the oxygen-containing gas supplied to the cathode 36 and the fuel gas supplied to the anode 38 are consumed in the electrochemical reactions at electrode catalyst layers of the cathode 36 and the anode 38 for generating electricity.

The oxygen-containing gas consumed at the cathode 36 is discharged into the oxygen-containing gas discharge passage 18b through the outlet buffer 57b, and the fuel gas supplied to the anode 38 is discharged into the fuel gas discharge passage 22b through the outlet buffer 60b.

The coolant supplied to the coolant supply passages 20a1, 20a2 moves along the coolant flow field 28 formed between the anode side separator 56 and the cathode side separator 54. After the coolant cools the membrane electrode assembly 12, the coolant is discharged into the coolant discharge passages 20b1, 20b2.

In the third embodiment, a pair of the fuel gas supply passages 22a1, 22a2 are formed at one end of the cathode side separator 54 and the anode side separator 56. In the structure, improvement in the performance of distributing the fuel gas is achieved, and the length of the inlet buffer 60a (distribution channel) from the fuel gas supply passages 22a1, 22a2 to the fuel gas flow field 30 is shortened effectively.

Likewise, a pair of the oxygen-containing gas supply passages 18a1, 18a2 are formed at the other end of the cathode side separator 54 and the anode side separator 56. In the structure, improvement in the performance of distributing the oxygen-containing gas is achieved, and the length of the inlet buffer 57a (distribution channel) from the oxygen-containing gas supply passages 18a1, 18a2 to the oxygen-containing gas flow field 24 is shortened effectively.

Therefore, the cathode side separator 54 and the anode side separator 56 are prevented from being elongated in the direction indicated by the arrow B, and thus, reduction in the overall size of the fuel cell 50 is achieved easily. Further, improvement in the performance of distributing the fuel gas and the oxygen-containing gas is achieved suitably.

Moreover, the fuel gas in the fuel gas flow field 30 and the oxygen-containing gas in the oxygen-containing gas flow field 24 flow in a counterflow manner over the entire electrode surfaces of the membrane electrode assembly 52 (see FIG. 5). Further, the oxygen-containing gas flows in parallel with the coolant flowing through the coolant flow field 28. In the structure, it is possible to achieve a uniform humidity distribution on the power generation surfaces of the membrane electrode assembly 52, and improvement in the power generation performance is achieved easily.

Further, the total dimension of the width h1 where the oxygen-containing gas flows into the inlet connection channel 26a1 connected to the oxygen-containing gas supply passage 18a1 and the width h2 where the oxygen-containing gas flows into the inlet connection channel 26a2 connected to the oxygen-containing as supply passage 18a1 is larger than the width h3 where the oxygen-containing gas is discharged through the outlet connection channel 26b connected to the oxygen-containing gas discharge passage 18b (see FIG. 6). Therefore, the flow speed of the oxygen-containing gas is increased at the oxygen-containing gas discharge passage 18b where the water produced in the power generation reaction tends to be condensed, and the condensed water can be discharged into the oxygen-containing gas discharge passage 18b easily.

The total dimension of the width h4 where the fuel gas flows into the inlet connection channel 32a1 connected to the fuel gas supply passage 22a1 and the width h5 where the fuel gas flows into the inlet connection channel 32a2 connected to the fuel gas supply passage 22a2 is larger than the width h6 where the fuel gas is discharged through the outlet connection channel 32b connected to the fuel gas discharge passage 22b. In the structure, the condensed water is discharged to the fuel gas discharge passage 22b suitably, and the desired power generation performance of the fuel cell 10 is achieved.

In the case where metal separators are used as the cathode side separator 54 and the anode side separator 56, the coolant flow field 28 is formed on the back surfaces of the fuel gas flow field 30 and the oxygen-containing gas flow field 24. In the structure, the shape of the coolant flow field 28 is simplified, and the coolant can be supplied into the coolant flow field 28 easily and reliably.

Figure 7:
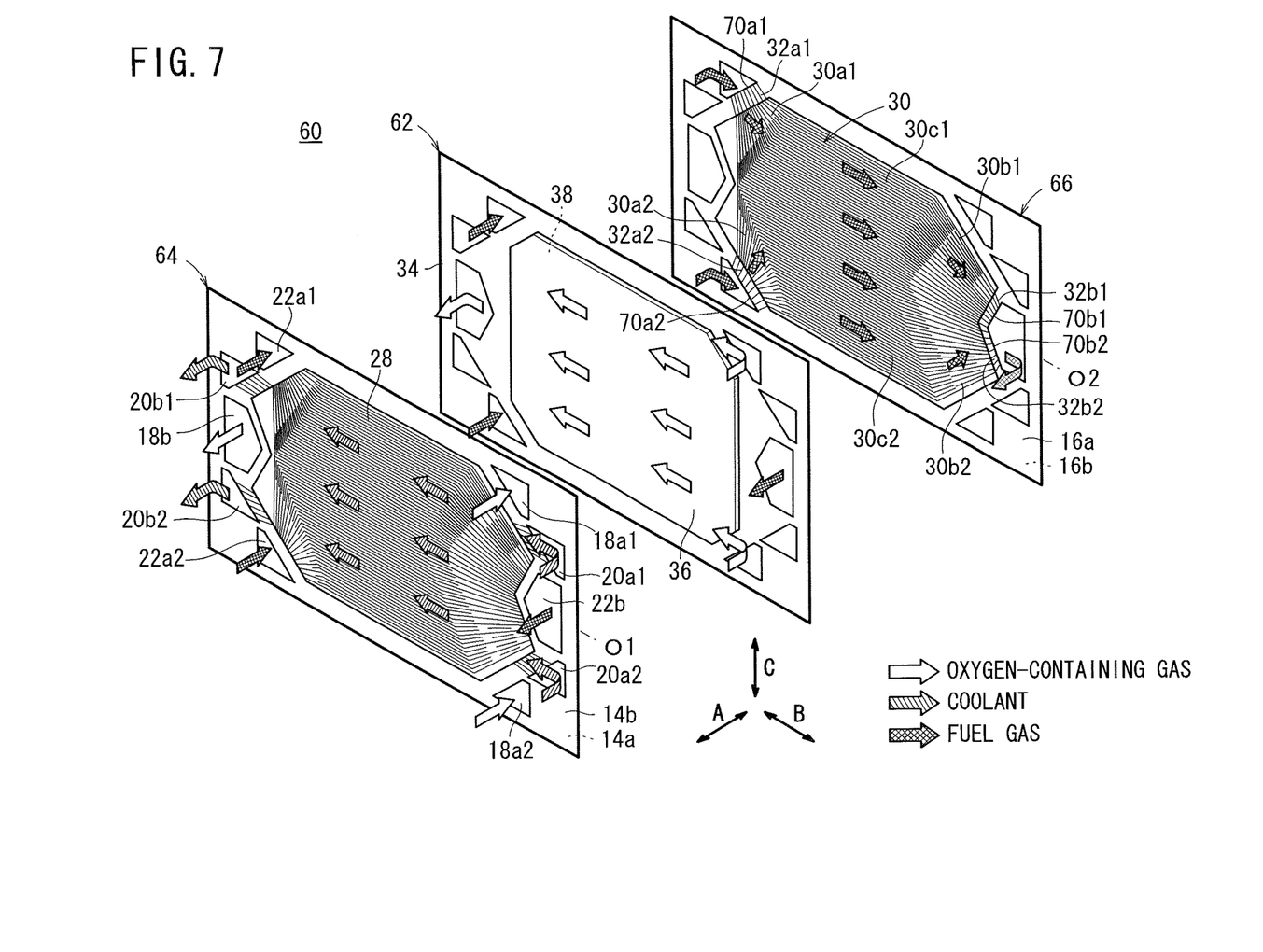
FIG. 7 is an exploded perspective view showing a fuel cell according to a fourth embodiment of the present invention.

FIG. 7 is an exploded perspective view showing a fuel cell 60 according to a fourth embodiment of the present invention. The constituent elements that are identical to those of the fuel cell 40 according to the second embodiment are labeled with the same reference numerals, and detailed descriptions thereof will be omitted.

The fuel cell 60 includes a membrane electrode assembly 62, and a cathode side separator 64 and an anode side separator 66 sandwiching the membrane electrode assembly 62. The cathode side separator 64 and the anode side separator 66 are metal separators. Alternatively, the carbon separators may be used as the cathode side separator 64 and the anode side separator 66.

Figure 8:
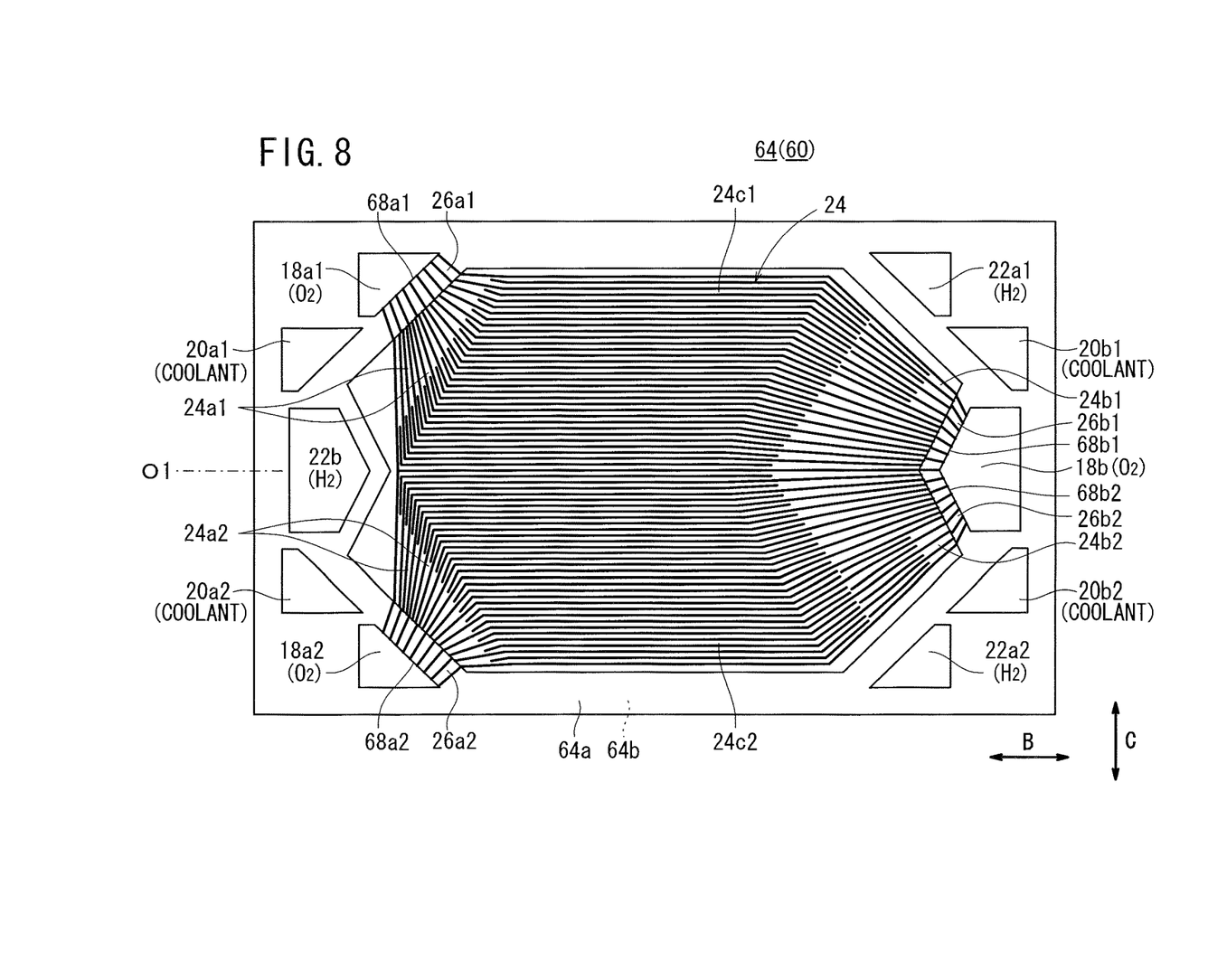
FIG. 8 is a front view showing a cathode side separator of the fuel cell.

As shown in FIG. 8, the oxygen-containing gas supply passages 18a1, 18a2 are inclined from main flow fields 24c1, 24c2. Specifically, end surfaces 68a1, 68a2 at the oxygen-containing gas inlet, of the oxygen-containing gas supply passages 18a1, 18a2 are substantially perpendicular to the flow direction of the oxygen-containing gas in the inlet channels 24a1, 24a1. That is, the flow grooves of the inlet channels 24a1, 24a2 have substantially the same length from the oxygen-containing gas supply passages 18a1, 18a2 to ends of the main flow fields 24c1, 24c2.

End surfaces 68b1, 68b2 at the oxygen-containing gas outlet, of the oxygen-containing gas discharge passage 18b are substantially perpendicular to the flow direction of the oxygen-containing gas in the outlet channels 24b1, 24b2. That is, the flow grooves of the outlet channels 24b1, 24b2 have substantially the same length from ends of the main flow fields 24c1, 24c2 to the oxygen-containing gas discharge passage 18b.

As shown in FIG. 7, the end surfaces 70a1, 70a2 at the fuel gas inlet, of the fuel gas supply passages 22a1, 22a2 are substantially perpendicular to the flow direction of the fuel gas in the inlet channels 30a1, 30a2. That is, the flow grooves of the inlet channels 30a1, 30a2 have substantially the same length from the fuel gas supply passages 22a1, 22a2 to ends of the main flow fields 30c1, 30c2.

The end surfaces 70b1, 70b2 at the fuel gas outlet, of the fuel gas discharge passage 22b are substantially perpendicular to the flow direction of fuel gas in the outlet channels 30b1, 30b2. That is, the flow grooves of the outlet channels 30b1, 30b2 have substantially the same length from ends of the main flow fields 30c1, 30c2 to the fuel gas discharge passage 22b.

In the fourth embodiment, as shown in FIG. 8, the oxygen-containing gas supply passages 18a1, 18a2 are inclined from the main flow fields 24c1, 24c2. The oxygen-containing gas discharge passage 18b is inclined from the main flow fields 24c1, 24c2.

In the structure, the flow grooves of the inlet channels 24a1, 24a2 have the same length, and the flow grooves in the outlet channels 24b1, 24b have the same length. Therefore, variation in the flow groove length is suppressed in the entire oxygen-containing gas flow field 24. Accordingly, the oxygen-containing gas is distributed uniformly over the entire oxygen-containing gas flow field 24.

Likewise, variation in the flow groove length is suppressed in the entire fuel gas flow field 30. Accordingly, the fuel gas is distributed uniformly over the entire fuel gas flow field 30, and thus good electric generation performance can be achieved. Moreover, the same advantages as in the case of the third embodiment are obtained.

While the invention has been particularly shown and described with reference to the preferred embodiments, it will be understood that variations and modifications can be effected thereto by those skilled in the art without departing from the spirit of the invention as defined by the appended claims.

What is claimed is:

1. A fuel cell formed by stacking an electrolyte electrode assembly and a separator in a stacking direction, the electrolyte electrode assembly including electrodes and an electrolyte interposed between the electrodes, a reactant gas supply passage and a reactant gas discharge passage extending through the fuel cell for allowing a reactant gas to flow in the stacking direction, a reactant gas flow field being formed between the electrolyte electrode assembly and the separator for allowing the reactant gas to flow along an electrode surface, the separator including an inlet connection channel portion connecting the reactant gas supply passage and the reactant gas flow field and an outlet connection channel portion connecting the reactant gas flow field and the reactant gas discharge passage, the reactant gas flow field including:

an inlet channel having a plurality of continuous and uninterrupted flow grooves coupled to the reactant gas supply passage;

an outlet channel having a plurality of continuous and uninterrupted flow grooves coupled to the reactant gas discharge passage; and an intermediate channel having a plurality of continuous and uninterrupted flow grooves with both ends connected to the inlet channel and the outlet channel respectively, wherein the flow grooves of the outlet channel are longer than the flow grooves of the inlet channel.

2. A fuel cell according to claim 1, wherein the inlet channel forms a first narrowed portion where the flow grooves in the inlet channel are narrowed from the intermediate channel toward the reactant gas supply passage; and the outlet channel forms a second narrowed portion where the flow grooves in the outlet channel are narrowed from the intermediate channel toward the reactant gas discharge passage.

3. A fuel cell according to claim 1, wherein the number of flow grooves in the outlet channel is decreased from the intermediate channel toward the reactant gas discharge passage.

4. A fuel cell according to claim 1, wherein the flow grooves of the intermediate channel have the same length.

* * * * *